United States Patent Office 2,864,116
Patented Dec. 16, 1958

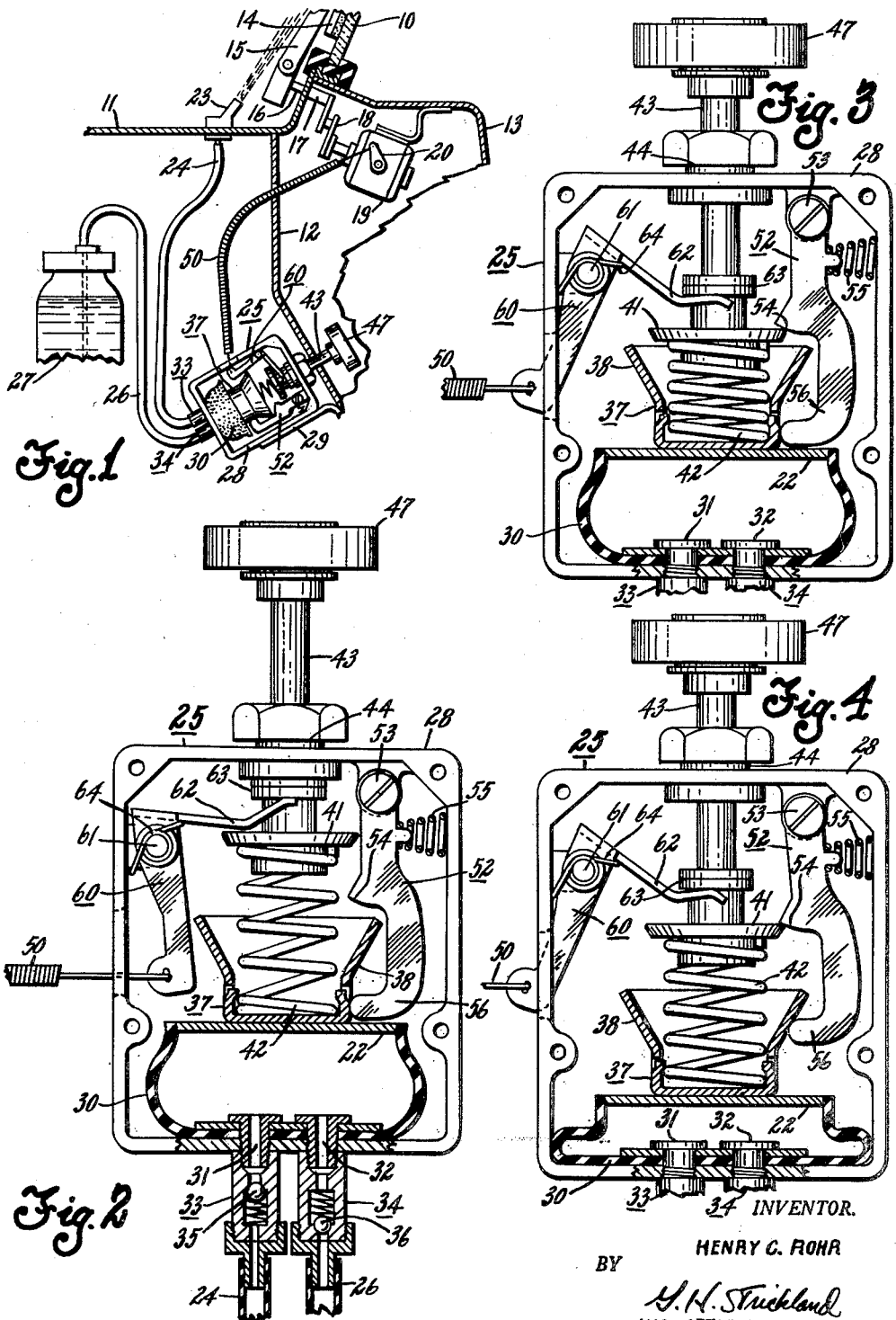

2,864,116

WINDSHIELD CLEANING SYSTEM

Henry C. Rohr, Rochester, N. Y., assignor to General Motors Corporation, Detroit, Mich., a corporation of Delaware Application February 24, 1955, Serial No. 490,331

14 Claims. (Cl. 15—250.4)

This invention pertains to the windshield washing art, and particularly to apparatus for discharging a liquid solvent onto a windshield and coordinating its operation with that of a windshield wiper.

Heretofore, washer pumps wherein one stroke thereof is effected manually, either by the hand or by the foot of an operator, have been designed. However, in prior devices of this type, the liquid displacing member was directly connected to a manually operable control whereby the operator exerted force against a substantially incompressible mass due to the small discharge orifice. Hence, the operator experienced considerable discomfort. The present invention relates to a foot operated washer pump wherein the operator merely supplies energy to an energy storing device of a resilient nature thereby obviating the discomfort attendant with prior art pumps of this type. In addition, means are incorporated whereby the windshield wiper, or wipers, are actuated concurrently with the washer as well as being automatically shut off simultaneously with termination of washer operation. Accordingly, among my objects are the provision of a pump having a fluid displacing member including energy storing means for effecting one stroke thereof in combination with a manually operable member for storing energy in said means; the further provision of a window cleaning system including means for coordinating the operation of a washer and a wiper; and the still further provision of a pump including means automatically operable by the fluid displacing member thereof for initiating one pump stroke upon completion of the other pump stroke.

The aforementioned and other objects are accomplished in the present invention by interposing a spring between a manually operable member and the fluid displacing member of the pump. Specifically, the pump includes a flexible rubber bulb which constitutes the fluid displacing member, the rubber bulb having a natural recovery characteristic so that it will assume its normal configuration after being deformed. The bulb is mounted in a casing having inlet and outlet check valves which are connected to intake and delivery conduits, respectively. The free end of the bulb has attached thereto a spring seat having cam means thereon for releasing a latch.

A second spring seat is connected to one end of a reciprocable shaft, the shaft being slidably supported in the casing. A coil spring is disposed between the two spring seats, this spring constituting a yielding operative connection between the shaft and the collapsible bulb, or bellows. The shaft extends through the vehicle firewall and has a pedal attached thereto. A latch arm is pivotally supported on the casing and spring biased to an operative position. A wiper actuating arm is also pivotally supported on the casing, one end of a Bowden wire control cable being connected thereto so as to initiate and terminate operation of windshield wiper mechanism concurrently with operation of the washer.

When the pedal is depressed, the upper spring seat is moved towards the lower spring seat thereby compressing the spring and storing energy therein. When the spring is substantially fully compressed, the upper spring seat is latched in its lower position by the latch arm. Thereafter, the energy stored in the spring will collapse the bulb thereby effecting the delivery stroke of the pump. Upon completion of the delivery stroke, the cam means will release the latch whereby the natural recovery characteristic of the bulb will cause the shaft, spring, and bulb to assume their normal positions during which, the intake stroke of the pump is effected. Inasmuch as movement of the pedal initiates and terminates operation of the washer, wiper operation will be automatically coordinated therewith.

Further objects and advantages of the present invention will be apparent from the following description, reference being had to the accompanying drawing wherein a preferred embodiment of the present invention is clearly shown.

In the drawing:

Fig. 1 is a fragmentary sectional view through a portion of a motor vehicle equipped with the window cleaning system of this invention.

Fig. 2 is a sectional view of the washer pump in the normal position after completion of the intake stroke.

Fig. 3 is a fragmentary view of the pump after depression of the pedal.

Fig. 4 is a fragmentary sectional view of the pump after substantial completion of the delivery stroke.

With particular reference to Fig. 1, the washing apparatus of this invention is shown in combination with a vehicle having a windshield 10, a cowl 11, a firewall 12 and an instrument panel 13. In a conventional manner, the vehicle includes wiping mechanism comprising an oscillatable wiper blade 14, which is detachably connected to a wiper arm 15. The wiper arm 15 is drivingly connected with one end of an oscillatable shaft 16 which is rotatably journaled in a bushing 17 and extends through the cowl 11. The shaft 16 is connected through a linkage 18 to electric motor driven actuating mechanism 19 which may be of the type disclosed in copending application Serial No. 450,890, filed August 19, 1954, in the name of Walter D. Harrison and assigned to the assignee of this invention. Operation of the electric motor driven wiper actuating mechanism 19 may be controlled by an oscillatable lever 20. Initiation and termination of wiper operation may be effected automatically and in coordination with operation of the washer mechanism of this invention, as will be disclosed more particularly hereinafter.

The washer mechanism includes a nozzle 23 having a small discharge orifice through which a spray of liquid solvent is directed into the path of the moving wiper blade 14. The nozzle 23 is mounted on the cowl 11, and the inlet thereof is connected to one end of a conduit 24. The other end of the conduit 24 is connected to the discharge port of a washer pump, generally designated by the numeral 25. The washer pump 25 is disposed on the engine side of the firewall 12, and the intake port thereof is connected by a conduit 26 to a reservoir or container 27. The pump 25 is disposed in a casing 28, which is supported by a bracket 29 attached to the firewall 12.

With particular reference to Figs. 1 and 2, the detailed construction of the pump 25 will be described. The liquid displacing member of the pump, as disclosed, comprises a flexible rubber bulb, or bellows, 30 having a natural recovery characteristic whereby it will assume the shape depicted in Fig. 2 under normal conditions. The lower end of the bulb 30 is attached to the casing 28 and has formed therein a discharge port 31 and an intake port 32. The discharge port 31 communicates with a fitting 33 having a spring biased, ball type check valve 35 therein. The intake port 32 communicates with fitting 34 having disposed therein a spring biased ball type check valve 36. The check valves are arranged in a conventional manner so that upon collapse of the rubber bulb 30, water will be discharged through the valve 35 and into the delivery conduit 24, while upon expansion of the bulb 30, water will be drawn from the reservoir 27 through intake conduit 26 and the check valve 36. While the liquid displacing member disclosed merely comprises a rubber bulb, it is to be understood that other types of liquid displacing members, such as spring biased pistons and diaphragms are contemplated by the present invention, and the use of a rubber bulb is only exemplary.

The upper end of the rubber bulb is closed by a plate 22 and has suitably connected thereto a spring seat 37 which may be formed integral with conical cam latch release means 38. A second spring seat 41 is attached to one end of a shaft 43 and adapted for movement between the position depicted in Fig. 2 and the position depicted in Fig. 3, wherein the flange of the spring seat 41 is retained by projection 54 of latch arm 52. A coiled compression spring 42 is disposed between the two spring seats 37 and 41.

The manually operable actuator for the washer pump comprises a reciprocable shaft 43 slidably supported by a bushing 44 carried by the casing 28. The shaft extends through the firewall 12 and is formed with a pedal portion 47, disposed in the passenger compartment of the vehicle.

A wiper actuating arm 60 is pivotally mounted at 61 on the casing 28. The arm 60 is in the form of a bellcrank, one end 62 of which is disposed between the spring seat 41 and a collar 63. The arm 60 is biased in a counterclockwise direction, as viewed in Fig. 2, by a torsion spring 64. The arm 60 is also connected to one end of a Bowden wire cable 50, the other end of which is connected to the wiper lever 20.

Upon depression of the pedal 47 from the position of Fig. 2 to the position of Fig. 3, movement will be imparted to the Bowden wire 50 so as to initiate operation of the wiper mechanism 19. Concurrently therewith the shaft 43 will move the spring seat 41 downward, thereby compressing spring 42 and storing energy therein. When the spring 42 is fully compressed, as depicted in Fig. 3, the shaft 43 will be maintained in the position of Fig. 3 by the latch arm 52. The latch arm 52 is pivotally mounted at 53 to the casing 28. An intermediate portion of the latch arm is formed with a hook 54 adapted to engage the upper surface of spring seat 41, as shown in Fig. 3. The latch arm 52 is normally urged in a clockwise direction about pivot 53 by a spring 55. The other end 56 of the latch arm 52 is positioned in the path of movement of the cam means 38 so that when the bulb 30 is substantially fully collapsed as shown in Fig. 4, the latch arm 52 will be pivoted in a counterclockwise direction, thereby releasing the shaft 43.

Operation

When the operator desires to effect washer operation, the pedal 47 is depressed by the operator's foot. By so doing, the operator compresses spring 42, thereby storing energy in this spring. Thus, the operator does not experience any discomfort inasmuch as he does not exert effort against an incompressible medium. Concurrently, with depression of the pedal 47, the wiper actuator mechanism 19 will be automatically set into operation through the Bowden wire 50. After the spring 42 is fully compressed, as depicted in Fig. 3, the shaft 43 will be latched in the lower position and, hence, the operator may remove his foot from the pedal 47. Thereafter, the energy stored in spring 42 will compress the bulb 30 and discharge liquid solvent through the port 31, check valve 35, the conduit 24 and the nozzle 23. Inasmuch as the wiper blade 14 is moving, the liquid solvent will be spread over the surface of the windshield so as to effect cleaning thereof.

When the bulb 30 is substantially fully collapsed, as shown in Fig. 4, the discharge of water from the nozzle 23 will terminate and concurrently therewith the latch release cam means 38 will deflect the arm 52, thereby releasing the shaft 43. Accordingly, the shaft 43 will return to the position of Fig. 2 due to the natural recovery characteristic of the bulb 30. When the shaft 43 returns to the position of Fig. 2, operation of the wiper will be automatically terminated through operation of the cable 50 by arm 60. During recovery of the rubber bulb 30, the intake stroke of the pump will be effected inasmuch as solvent will be drawn through the conduit 26 from the reservoir 27.

From the foregoing, it is apparent that the present invention results in a foot operated washer, which may be conveniently coordinated with operation of wipers. In addition, the only force which must be exerted by the operator is the force required to compress the pump operating spring. Furthermore, the operator need not exert continuous effort on the pedal since it is automatically latched upon completion of its energy storing movement, and automatically released upon completion of the delivery stroke of the pump.

While the embodiment of the present invention as herein disclosed, constitutes a preferred form, it is to be understood that other forms might be adopted.

What is claimed is as follows:

1. A pump having a fluid displacing elastic bulb with an intake stroke and a delivery stroke, inlet and outlet valves communicating with the interior of said bulb, power means acting thereon to effect one stroke, said fluid displacing bulb having a natural recovery characteristic which effects the other stroke, and power interrupting means movable with the bulb during said one stroke and operatively connected with said power means for rendering said power means inoperative so as to permit the natural recovery characteristic of said bulb to effect said other stroke.

2. In a windshield washer, a pump having a displacing member with an intake stroke and a discharge stroke, inlet and outlet valves communicating with said pump, a spring normally acting on said displacing member for effecting one stroke thereof, said member having a natural recovery characteristic which is operable to effect the other stroke, manually operable means enageable with said spring for storing energy in said spring so as to effect said one stroke, latch means operatively engageable with said spring to hold said spring in its energy stored position during said one stroke, and means movable by said displacing member and engageable with said latch means for releasing said latch means to permit the natural recovery characteristic of said displacing member to effect said other stroke.

3. A pump having a fluid displacing member with an intake stroke and a delivery stroke, inlet and outlet valves communicating with said pump, energy storing means acting constantly on said member to effect one stroke, said fluid displacing member having a natural recovery characteristic which effects the other stroke, and means movable with the displacing member and engageable with the energy storing means during the said one stroke for rendering said energy storing means inoperative so as to permit the natural recovery characteristic of said displacing member to effect said other stroke.

4. A pump having a fluid displacing member with an intake and a delivery stroke, inlet and outlet valves communicating with said pump, a spring acting thereon to effect one stroke, said fluid displacing member having a natural recovery characteristic which effects the other stroke, and means movable with the displacing member and operatively engageable with said spring during said one stroke for releasing said spring so as to permit the natural recovery characteristic of said displacing member to effect said other stroke.

5. A pump having a fluid displacing member with an intake stroke and a delivery stroke, inlet and outlet valves communicating with said pump, a spring acting constantly on said member for effecting one stroke thereof, said fluid displacing member having a natural recovery characteristic which effects the other stroke thereof manually operable means engageable with said spring for storing energy in said spring so as to effect said one stroke, and means movable with the displacing member and operatively engageable with said spring during said one stroke for releasing said spring so as to permit the natural recovery characteristic of said displacing member to effect said other stroke.

6. The pump set forth in claim 5 wherein said means for storing energy in said spring comprises a foot actuated member, and wherein said pump includes latch means for holding said manually operable member and said spring in its energy stored position during said one stroke.

7. A window cleaning system including in combination, a wiper movable across the surface of the window, means for spraying liquid in the path of said wiper, means for actuating said wiper, a pump for supplying said spraying means with liquid under pressure, said pump including a liquid displacing member having an intake stroke and a delivery stroke, and spring means for effecting the delivery stroke of said pump, said liquid displacing member having a natural recovery characteristic for effecting the intake stroke thereof, a manually operable member for storing energy in said spring means so as to effect the delivery stroke of said pump, and means operable by said manually operable member during movement thereof to store energy in said spring means for initiating operation of said wiper actuating means, said last recited means being automatically operable by said liquid displacing member during the delivery stroke thereof for terminating operation of the wiper actuating means.

8. The combination set forth in claim 7 wherein said pump includes latch means operable to hold said spring means in its energy stored position during the delivery stroke thereof and means movable by said displacing member for releasing said latch means to permit the natural recovery characteristic of said displacing member to effect the intake stroke.

9. The combination set forth in claim 7 wherein said manually operable member comprises a pedal, and wherein the means for initiating and terminating operation of the wiper actuating means includes a Bowden wire which is operatively connected to and movable by said pedal.

10. The combination set forth in claim 9 wherein said pump includes latch means for holding said spring means and said pedal in a predetermined position in which the energy stored in said means is retained, and wherein said liquid displacing member carries a release member movable thereby for releasing said latch means during the delivery stroke thereof.

11. A windshield washer pump unit including, an elastic bulb having an intake stroke and a delivery stroke, inlet and outlet valves communicating with the interior of said bulb, a spring acting on said bulb for effecting the delivery stroke thereof, said bulb having a natural recovery characteristic for effecting the intake stroke, a foot actuated member engageable with said spring for storing energy in said spring to effect the delivery stroke of said bulb, latch means operatively engageable with said spring to hold said spring in its energy stored position during the delivery stroke of said bulb, and cam means attached to said bulb and movable therewith, said cam means being engageable with said latch means upon completion of the delivery stroke of said bulb for releasing said latch means to thereby release said spring.

12. A windshield washer pump including: a casing, an elastic bulb disposed in said casing having an intake stroke and a delivery stroke, a foot actuated reciprocable member supported in said casing, a spring seat attached to said member, a spring seat attached to said bulb, a spring interposed between said spring seats for effecting the delivery stroke of said bulb upon compression of said spring by said foot actuated member so as to store energy therein, a latch lever pivotally mounted in said casing and spring-biased into engagement with the spring seat on said member so as to hold said spring in its energy stored position, inlet and outlet valves communicating with the interior of said bulb, said bulb carried spring seat having a cam surface thereon engageable with said latch lever upon completion of the delivery stroke of said bulb for moving said latch out of engagement with the spring seat carried by said member to permit the natural recovery characteristic of said bulb to effect the intake stroke thereof.

13. A window cleaning system including, in combination, a wiper movable across the surface of the window, means for spraying liquid in the path of said wiper, means for actuating said wiper, a pump for supplying said spraying means with liquid under pressure, said pump including an elastic bulb having an intake stroke and a delivery stroke, inlet and outlet valves communicating with the interior of said bulb, spring means acting on said bulb for effecting the delivery stroke thereof, said bulb having a natural recovery characteristic for effecting the intake stroke thereof, a foot actuated member for storing energy in said spring means so as to effect the delivery stroke of said bulb, latch means engageable with said spring means for holding said spring means in its energy stored position during the delivery stroke of said bulb, an element engageable with said foot actuated member for initiating operation of said wiper actuating means upon movement of said member to store energy in said spring means, and means movable by said bulb and operatively associated with said latch means for releasing said latch means upon completion of the delivery stroke of said bulb for actuating said element to terminate operation of the wiper actuating means.

14. A window cleaning system including in combination, a wiper movable across the surface of the window, means for spraying liquid in the path of said wiper, means for actuating said wiper, a pump for supplying said spraying means with liquid under pressure, said pump including a liquid displacing member having an intake stroke and a delivery stroke, and spring means for effecting the delivery stroke of said pump, said liquid displacing member having a natural recovery characteristic for effecting the intake stroke thereof, means for storing energy in said spring means so as to effect the delivery stroke of said pump, and means operable by said last recited means during movement thereof to store energy in said spring means for initiating operation of said wiper actuating means, said means operable by the said last recited means being automatically operable by said liquid displacing member during the delivery stroke thereof for terminating operation of the wiper actuating means.

References Cited in the file of this patent

UNITED STATES PATENTS

| 1,117,779 | Bulmer | Nov. 17, 1914 |
| 1,723,909 | Alvey | Aug. 6, 1929 |
| 2,206,814 | Horton | July 2, 1940 |
| 2,688,514 | Oishei et al. | Sept. 7, 1954 |

FOREIGN PATENTS

| 339,518 | Great Britain | Dec. 11, 1930 |
| 1,083,693 | France | June 30, 1954 |